Figure 1:
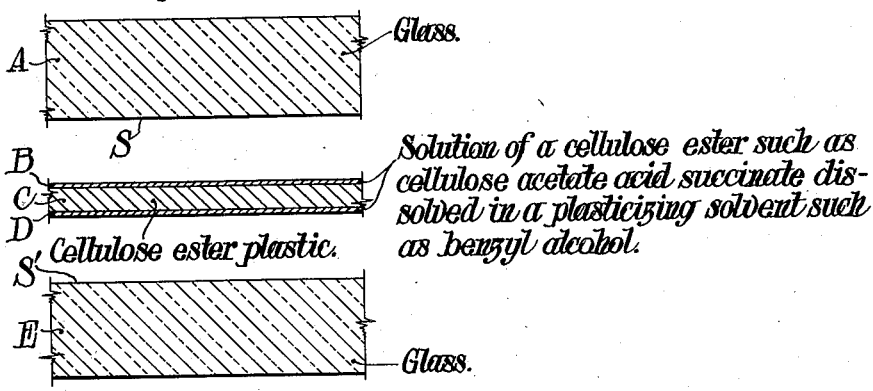

Jan. 7, 1936.   J. G. McNALLY ET AL   2,026,987
LAMINATED GLASS
Filed March 11, 1933

A — Glass.
B, C, D — Solution of a cellulose ester such as cellulose acetate acid succinate dissolved in a plasticizing solvent such as benzyl alcohol.
Cellulose ester plastic.
E — Glass.

Inventors:
James G. McNally & Sterling S. Sweet,
By Daniel J. Mayne
Newton N. Lesnieux
Attorneys.

Patented Jan. 7, 1936

2,026,987

UNITED STATES PATENT OFFICE 2,026,987

LAMINATED GLASS

James G. McNally and Sterling S. Sweet, Rochester, N. Y., assignors to Eastman Kodak Company, Rochester, N. Y., a corporation of New York Application March 11, 1933, Serial No. 660,406

8 Claims. (Cl. 49—81.5)

This invention relates to laminated or safety glass and to the process of producing it. More particularly the invention relates to a new and improved process for the manufacture of this type of glass wherein a relatively thin sheet of transparent thermoplastic material, such as cellulose acetate, or other cellulosic material, is interposed between and firmly secured to sheets of glass by means of a special adhesive or adhesion inducing agent.

Heretofore many types of laminated glass have been made. In practically all of these products a sheet of transparent thermoplastic material is interposed between the sheets of glass and adhesively secured thereto by means of special adhesives or cements. In fact, the principal problems encountered in the production of this socalled safety glass have centered around the selection of the proper adhesives. It has been proposed to unite a sheet of cellulose acetate or cellulose nitrate to glass by coating the cellulose acetate with various plasticizing substances such as triacetin, interposing the treated plastic sheet between sheets of glass and applying heat and pressure, but notwithstanding the claims made for these methods, they have never proved to be wholly satisfactory and it has been recognized that a completely satisfactory product cannot be manufactured in this manner.

When using cellulose nitrate as the principal plastic layer, it is found that the glass, even after relatively short periods of exposure, turns yellow or even brown, due to photochemical decomposition of the cellulose nitrate. It is, therefore, desirable to use a type of material which will withstand the action of sun-light and is substantially unaffected by photochemical action. Cellulose acetate fully meets these requirements, but as above indicated, the problem has been to so secure the cellulose acetate sheet to the glass that it will not separate or chip off when injured by a sudden blow. It is of first importance in this type of safety glass that the adhesion will be of such a character that when the glass surface is broken, the broken particles of glass will remain firmly stuck to the interposed plastic layer or layers.

Our invention has as an object to overcome the above mentioned prior art difficulties and to provide a product in which glass sheets are firmly and, for all practical purposes, inseparably united to an interposed layer of non-brittle thermoplastic material. A further object is to provide a process for producing a tough, strong, transparent, laminated glass which is stable with respect to sun-light and immune to photochemical discoloration or disintegration. Another object is to provide a process for cementing preformed sheets of colloidized cellulose organic derivatives to glass surfaces. A specific object is to provide a new type of laminated glass in which cellulose acetate, or its equivalent, is permanently and adhesively joined to glass by means of a special type of adhesive or adhesion inducing substance. Other objects will hereinafter appear.

We have carried on extensive research in the manufacture of safety glass and have conducted experiments using a wide variety of thermoplastic materials for the interposed plastic layer and many different agents for effecting adhesion. The principal difficulty encountered in making glass of this character was to obtain a proper adhesive or adhesion inducing substance. After investigating many different compounds we have discovered that certain carbohydrate derivatives, such as the acid esters of cellulose derived from dicarboxylic acids, which esters contain at least one free carboxyl group are particularly effective. Typical among these esters may be mentioned, cellulose acetate phthalate, cellulose acetate acid succinate, cellulose acetate diglycollate, and starch acetate succinate. The ester employed may be a single acid ester of cellulose or starch or an ester containing a plurality of differing acyl groups. It will be noted, however, that all of these compounds have at least one acyl group having at least one free carboxyl group. Although we do not confine ourselves to any particular theory or explanation of their effectiveness in our process it appears that the presence of one or more free carboxyl groups therein gives to these compounds their peculiar adhesive or adhesion inducing properties and renders them much superior to any substances heretofore proposed for the purpose of laminating glass and plastic material.

Our process is quite simple as far as its manipulative details are concerned and consists, in its essential features, in filming the surfaces of a relatively thin sheet of thermoplastic material such as cellulose acetate, for example, with a solution of a mixed acid ester of cellulose in an appropriate solvent, interposing the sheet between two sheets of glass, and assembling and pressing the composite sheet together under the influence of heat.

We will now describe our invention in detail by reference to an example in which we have set forth one of the preferred embodiments of our invention which is included merely for purposes of illustration and not as a limitation.

Example 1

Two sheets of glass approximately ¼ inch thick are carefully cleaned, washed and dried. A sheet of clear, transparent, cellulose acetate is prepared by any known procedure, such as by coating a dope of given composition which may contain plasticizers, softening agents and the like, on an appropriate surface or by skiving a sheet of proper thickness from a preformed slab or block of the plastic material. We prefer to use a sheet about .025 inch thick. An extremely thin film consisting of a solution comprising 2 grams cellulose acetate acid succinate dissolved in 40 grams of a high boiling plasticizer, such as benzyl alcohol is deposited on the surfaces of the plastic sheet. Optionally, a surface of each of the glass sheets may be thus treated with the solution and the glass pressed against the plastic material. The assembled sheet is then placed in a platen press and pressed for three minutes at about 90° C. and a pressure of 100 lbs. per square inch to insure initial sticking together of the various layers. The sheet is then placed in a liquid pressure autoclave, such as is commonly used for this purpose in the glass making industry, and subjected to a uniform liquid pressure of 250 lbs. per square inch at a temperature of about 140° C. for about fifteen minutes. After this heat and pressure treatment, the sheet is cooled and washed, after which it is found that the glass is firmly and inseparably bound to the interposed plastic material and that a strong, clear, transparent article is obtained.

Example 2

Two sheets of glass are prepared as in Example 1 by thorough cleaning, washing, and drying. A film is deposited on both surfaces of a sheet of clear, transparent cellulose acetate plastic about .025 inch in thickness by spraying with a solution prepared by dissolving 1 gram of cellulose acetate diglycollate in 10 grams of benzaldehyde. The sheet is then interposed between the glass plates and the structure assembled and subjected for about five minutes to a pressure of about 180 pounds per square inch in a platen press at a temperature of 130° C. The sandwich is then removed from the platen press and subjected to a pressure of 300 pounds per square inch in a liquid pressure autoclave at a temperature of 140° C. After removal from the autoclave and appropriate washing and drying, an excellent laminated glass structure is found to have been produced.

Example 3

A laminated glass structure is produced employing the same conditions of Example 2, except that the solution with which the cellulose acetate sheet is treated is formed by dissolving 1 gram of starch acetate acid succinate in 10 grams of benzyl alcohol. As in the previous examples, an excellent type of laminated glass results.

Figure 2:
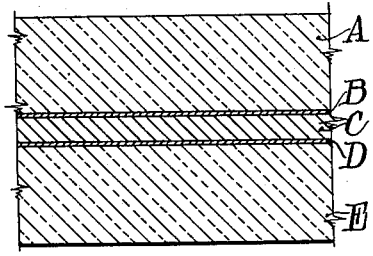

Referring to the drawing in which the structure of our new laminated glass product is more graphically shown and in which it is understood that the relative thickness of the respective laminæ are greatly exaggerated for the sake of clearness, Fig. 1 is a sectional view illustrating the laminæ before assembly;

Fig. 2 is a sectional view illustrating the assembled glass sheet.

In Fig. 1, A and E designate sheets of glass, the respective surfaces S and S' of which have been properly prepared by washing and drying. C represents a thin sheet of cellulose acetate, treated on both surfaces with very thin films B and D of a solution of cellulose acetate acid succinate dissolved in benzyl alcohol, and ready for assembling with the two glass sheets A and E.

In Fig. 2 is shown the composite sheet after assembling and pressing together in accordance with the procedure outlined above. While we do not attempt to offer any theory as to the action of the adhesives or adhesion inducing materials used in our process, it seems probable that the mixed cellulose acid ester remains in the interface between the glass and plastic and produces some peculiar effect upon the plastic which causes it to adhere tenaciously to the glass, while the plasticizing solvent penetrates to a certain extent into the plastic and probably in some way enhances the adhesive quality of the plastic surface in contact with the glass. Whatever the explanation, the resulting laminated glass sheets have a higher degree of adhesion to the interposed plastic material than has been heretofore attainable by employing any of the known types of adhesives or adhesion inducing substances.

Our product will successfully withstand comparatively severe shocks and even direct blows of considerable force without shattering. If the material is subjected to blows of such force that the outer glass layers are broken, the powerful adhesion between the glass and plastic prevents chipping off or breaking away of the glass fragments.

We wish again to call attention to the fact that Fig. 2 is merely a graphic representation of the assembled laminated sheet and is not intended as an exact showing of the actual structure, since under the influence of heat and pressure the extremely thin layers or films B and D tend to merge with the plastic material of sheet C and as pointed out, the plasticizing solvent probably tends to penetrate into the interior thereof. However, we have conclusively determined that practically all of the essential adhesive material, i. e., the cellulose organic acid ester remains in the interface or area between the glass and plastic.

While we have described our invention by reference to the several typical compounds as the adhesive or adhesion inducing agents and by reference to a particular procedure, our invention is in no way limited thereby. We may, for example, employ as such agents a wide variety of compounds of cellulose derived from dicarboxylic, saturated or unsaturated acids of both the aliphatic and aromatic series. We may employ any of the acid esters, such as the phthalates or succinates of cellulose, especially the esters prepared according to the methods outlined in the application of C. J. Malm and C. E. Waring, Serial No. 380,252 and containing a free carboxyl group. This classification, therefore, includes cellulose esters produced by the esterification of one or more of the esterifiable hydroxyl groups per $C_6H_{10}O_5$, such as the mono, di-, or triphthalates, and the mono-, di-, and trisuccinates.

We may likewise employ cellulose esters having different acyl groups in the molecule, such as cellulose acetate acid phthalate, cellulose acetate diglycollate, cellulose acetate acid succinate, and even cellulose acetate tartrate. Other saturated acid groups may be present instead of acetyl, for example, formyl, propionyl, lactyl, and the like.

As explained above, it is apparently the presence of the free carboxyl groups in the ester which gives it its unexpected and distinguishing adhesive properties, regardless of whether the ester is a single ester, that is to say, one derived from a single acid, such as succinic, phthalic, glycollic and so on, or is a mixed ester containing different acyl groups. So long as the free carboxyl group is present we have found these esters to be eminently satisfactory for our purpose.

While we have described our invention with reference to cellulose derivatives, we are not limited thereto, as we may employ the single or mixed acid esters of monobasic and polybasic acids of polymeric compounds containing free hydroxyl groups other than cellulose, such as those derivable from starch and inulin. Our invention is also applicable to the lamination of cellulose nitrate sheets to glass, as well as the lamination of a sheet of cellulose acetate overcoated with cellulose nitrate.

The cellulose acid esters above described may be dissolved in a variety of solvents, but we prefer to employ substances of low vapor pressure which are plasticizing solvents for the plastic material of the interposed sheet. Among these may be mentioned benzyl alcohol, benzyl acetate, triacetin, methyl cellosolve (the monomethyl ether of ethylene glycol), ethyl tartrate, acetophenone, ethyl acetanilid, salicylaldehyde, cinnamic acid, hydroxy benzoyl alcohol, ethylene glycol monobenzyl ether and amyl borate. While we have described the use of a relatively dilute solution of the acid ester in the higher boiling solvent, more concentrated solutions are satisfactory. On the other hand the concentration of the ester in the solution may be much lower. In general, the amount of ester will be governed, not only by the degree of adhesion desired, but by the consistency of the resulting solution, it being obvious that highly concentrated solutions will be more viscous and therefore more difficult to apply to the plastic sheet.

We prefer to apply the adhesive solution to the plastic (or to the glass) by spraying as this method distributes the material in a more even film than is possible with any other, but it may be applied by brushing, dipping or any equivalent and convenient procedure.

The details of the operations following the application of the adhesive may also vary widely. Although we prefer to subject the assembled sheets of glass and plastic to a comparatively moderate preliminary pressure, say in the vicinity of 100 lbs. per square inch and a temperature of about 90° C., we may vary this pressure and temperature, as likewise the final pressure and temperature. In the second pressing operation a temperature of about 140° C. is found satisfactory with a pressure of 250–450 lbs.

It is apparent from the foregoing that a laminated glass comprising a single glass sheet laminated to a single plastic sheet may be produced or a plurality of layers of glass and plastic may be built up as in the manufacture of so-called bullet proof glass. In this latter type of glass it is customary to interpose a comparatively thick sheet of glass between two thinner sheets, the latter being secured to the thicker sheets by means of interposed layers of thermoplastic material. In making this type of product the same difficulty has been experienced as in the manufacture of the ordinary product, namely, the difficulty of obtaining the desired degree of adhesion between the plastic material and the glass and, so far as we are aware this difficulty has never been entirely overcome until the development of the present process.

It is further apparent that our invention has many advantages which commend it to the manufacturer of laminated glass. It is comparatively simple as far as manipulative details are concerned, involves no substantial departure from established practice, and requires only the conventional types of apparatus used in the laminated glass industry. It requires no pretreatment of the plastic sheet, such as the application of overcoatings of gelatin, cellulose nitrate or similar agents to produce the desired tenacious adhesion between plastic and glass.

As many apparently widely different embodiments of this invention may be made without departing from the spirit and scope thereof, it is to be understood that we do not limit ourselves to the specific embodiments thereof except as defined in the appended claims.

What we claim as new and desire to secure by Letters Patent of the United States is:

1. Laminated glass comprising glass and thermoplastic cellulose derivative sheets adhesively bonded thereto by the agency of a film containing a mixed carbohydrate organic ester at least one of the acyl groups of which contains a free carboxyl group.

2. Laminated glass comprising a thermoplastic sheet of cellulose derivative material bonded to sheets of glass and having between the cellulose derivative material and the glass a bonding film comprising a mixed carbohydrate organic ester at least one of the acyl groups of which contains a free carboxyl group.

3. Laminated glass comprising a thermoplastic sheet of cellulose derivative material bonded to sheets of glass and having between the cellulose derivative material and the glass a bonding film comprising a mixed cellulose organic ester at least one of the acyl groups of which contains a free carboxyl group.

4. Laminated glass comprising a thermoplastic sheet of cellulose derivative material bonded to sheets of glass and having between the cellulose derivative material and the glass a bonding film comprising a mixed cellulose ester of a fatty acid, and a dicarboxylic acid, one of the acyl groups of which ester contains a free carboxyl group.

5. Laminated glass comprising a thermoplastic sheet of cellulose derivative material bonded to sheets of glass and having between the cellulose derivative material and the glass a bonding film comprising a cellulose ester of acetic acid and a dicarboxylic acid one of the acyl groups of which ester contains a free carboxyl group.

6. Laminated glass comprising a thermoplastic sheet of cellulose derivative material bonded to sheets of glass and having between the cellulose derivative material and the glass a bonding film comprising cellulose acetate succinate.

7. Laminated glass comprising a thermoplastic sheet of cellulose derivative material bonded to sheets of glass and having between the cellulose derivative material and the glass a bonding film comprising cellulose acetate phthalate.

8. Laminated glass comprising a thermoplastic sheet of cellulose derivative material bonded to sheets of glass and having between the cellulose derivative material and the glass a bonding film comprising cellulose acetate diglycollate.

JAMES G. McNALLY.
STERLING S. SWEET.